United States Patent
Haskell et al.

(10) Patent No.: US 6,618,444 B1
(45) Date of Patent: *Sep. 9, 2003

(54) SCENE DESCRIPTION NODES TO SUPPORT IMPROVED CHROMA-KEY SHAPE REPRESENTATION OF CODED ARBITRARY IMAGES AND VIDEO OBJECTS

(75) Inventors: Barin Geoffry Haskell, Tinton Falls, NJ (US); Atul Puri, Riverdale, NY (US); Robert Lewis Schmidt, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/469,170

(22) Filed: Dec. 21, 1999

Related U.S. Application Data

(63) Continuation-in-part of application No. 09/112,413, filed on Jul. 9, 1998, now Pat. No. 6,208,693, which is a continuation-in-part of application No. 08/801,716, filed on Feb. 14, 1997, now Pat. No. 5,974,172
(60) Provisional application No. 60/142,884, filed on Jul. 8, 1999, and provisional application No. 60/052,971, filed on Jul. 18, 1997.

(51) Int. Cl.[7] .............................. H04B 1/66; G06K 9/46; H04N 9/75
(52) U.S. Cl. ................... 375/240.24; 382/243; 348/592
(58) Field of Search ........................ 375/240.24, 240.12, 375/240.11, 240.25, 240.09, 240.08; 382/166, 164, 242, 243, 266, 268; 348/592, 593, 587

(56) References Cited

U.S. PATENT DOCUMENTS

| | | | | |
|---|---|---|---|---|
| 4,394,680 A | * | 7/1983 | Watanabe | 348/587 |
| 5,117,283 A | * | 5/1992 | Kroos et al. | 348/586 |

(List continued on next page.)

FOREIGN PATENT DOCUMENTS

| EP | 0 753 970 A2 | 1/1997 |
|---|---|---|

OTHER PUBLICATIONS

MPEG4 Video Verification Model VM 5.0, pp. 2–192.
MPEG–4 Systems, ISO/IEC JTC1/SC29/WG11 N1901, Nov. 21, 1997.
Chen et al, IEEE International Conference on Image Processing, "An Approach to Region Coding for Content–Based Scalable Video", Sep. 16, 1996, vol. 3, pp. 399–402.
Chen et al, IEEE Transactions on Circuits and Systems for Video Technology, "Coding of Subregions for Content–Based Scalable Video", Feb. 1997, vol. 7, No. 1, pp. 256–260.

\* cited by examiner

*Primary Examiner*—Gims S. Philippe
(74) *Attorney, Agent, or Firm*—Kenyon & Kenyon

(57) ABSTRACT

A technique implicitly encodes shape information by using a chroma-key color. A frame including an object is received and a box bounding the object is created. The pixels in the bounding box outside the object are identified and replaced with a key color. The object is coded. A first bitstream is output that includes the coded data for the pixels in the bounding box, and a second bitstream is output that includes a node containing the key color and chroma-key thresholds for the object. In one embodiment, the node is a MaterialKey node. In a further embodiment, the node comprises a transparency field, an isKeyed field, an isRGB field, a keycolor field, a lowThreshold field, and a highThreshold field. A decoding system decodes the object and rectangular bounding box containing the object, and assigns a value signifying transparent to each pixel for which the difference between the color of each of said decoded pixels and the key color is below or equal to a low threshold, and assigns a value signifying opaque to each pixel for which said difference is greater than a high threshold.

32 Claims, 7 Drawing Sheets

U.S. PATENT DOCUMENTS

| | | | |
|---|---|---|---|
| 5,194,941 A | * 3/1993 | Grimaldi et al. | 348/587 |
| 5,659,490 A | * 8/1997 | Imamura | 382/164 |
| 5,748,789 A | 5/1998 | Lee et al. | |
| 5,963,257 A | * 10/1999 | Katata et al. | 375/240.11 |
| 5,974,172 A | * 10/1999 | Chen | 382/166 |
| 5,974,184 A | 10/1999 | Eifrig et al. | |
| 5,999,219 A | * 12/1999 | Boon | 375/240.12 |
| 6,122,014 A | * 9/2000 | Panasupone et al. | 348/592 |
| 6,141,442 A | * 10/2000 | Chen | 382/166 |
| 6,208,693 B1 | * 3/2001 | Chen et al. | 375/240.24 |
| 6,233,356 B1 | 5/2001 | Haskell et al. | |
| 6,459,732 B2 | * 10/2002 | Chen et al. | 375/240.08 |

SCENE DESCRIPTION NODES TO SUPPORT IMPROVED CHROMA-KEY SHAPE REPRESENTATION OF CODED ARBITRARY IMAGES AND VIDEO OBJECTS

CROSS-REFERENCE TO RELATED APPLICATIONS

This application claims priority from U.S. Provisional Application Ser. No. 60/142,884, filed Jul. 8, 1999. In addition, application is a continuation-in-part of U.S. application Ser. No. 09/112,413 now U.S. Pat. No. 6,208,693, filed Jul. 9, 1998, which claims priority from U.S. Provisional Application Ser. No. 60/052,971, filed on Jul. 18, 1997. U.S. application Ser. No. 09/112,413 is a continuation-in-part of U.S. application Ser. No. 08/801,716 now U.S. Pat. No. 5,974,172, filed on Feb. 14,1997 entitled "Method and Apparatus for Coding Segmented Regions Which May Be Transparent In Video Sequences For Content-Based Scalability," incorporated by reference herein.

BACKGROUND OF THE INVENTION

The present invention relates to the field of digital video coding technology and, more particularly, to a method and apparatus for providing an improved chroma-key shape representation of video objects of arbitrary shape.

A variety of protocols for communication, storage and retrieval of video images are known. Invariably, the protocols are developed with a particular emphasis on reducing signal bandwidth. With a reduction of signal bandwidth, storage devices are able to store more images and communications systems can send more images at a given communication rate. Reduction in signal bandwidth increases the overall capacity of the system using the signal.

However, bandwidth reduction may be associated with particular disadvantages. For instance, certain known coding systems are lossy because they introduce errors which may affect the perceptual quality of the decoded image. Others may achieve significant bandwidth reduction for certain types of images but may not achieve any bandwidth reduction for others. Accordingly, the selection of coding schemes must be carefully considered.

The Motion Picture Expert Group (MPEG) has successfully introduced two standards for coding of audiovisual information, known by acronyms as MPEG-1 and MPEG-2. MPEG is currently working on a new standard, known as MPEG-4. MPEG-4 video aims at providing standardized core technologies allowing efficient storage, transmission and manipulation of video data in multimedia environments. A detailed proposal for MPEG-4 is set forth in MPEG-4 Video Verification Model (VM) 5.0, hereby incorporated by reference.

MPEG-4 considers a scene to be a composition of video objects. In most applications, each video object represents a semantically meaningful object. Each uncompressed video object is represented as a set of Y, U, and V components (luminance and chrominance values) plus information about its shape, stored frame after frame in predefined temporal intervals. Each video object is separately coded and transmitted with other objects. As described in MPEG-4, a video object plane (VOP) is an occurrence of a video object at a given time. For a video object, two different VOPs represent snap shots of the same video object at two different times. For simplicity we have often used the term video object to refer to its VOP at a specific instant in time.

As an example, FIG. 1(A) illustrates a frame for coding that includes a head and shoulders of a narrator, a logo suspended within the frame and a background. FIGS. 1(B)–1(D) illustrate the frame of FIG. 1 (A) broken into three VOPs. By convention, a background generally is assigned VOP∅. The narrator and logo may be assigned VOP1 and VOP2 respectively. Within each VOP, all image data is coded and decoded identically.

The VOP encoder for MPEG-4 separately codes shape information and texture (luminance and chrominance) information for the video object. The shape information is encoded as an alpha map that indicates whether or not each pixel is part of the video object. The texture information is coded as luminance and chrominance values. Thus, the VOP encoder for MPEG-4 employs explicit shape coding because the shape information is coded separately from the texture information (luminance and chrominance values for each pixel). While an explicit shape coding technique can provide excellent results at high bit rates, explicit shape coding requires additional bandwidth for carrying shape information separate from texture information. Moreover, results are unimpressive for the explicit shape coding at low coding bit rates because significant bandwidth is occupied by explicit shape information, resulting in low quality texture reconstruction for the object.

As an alternative to explicitly coding shape information, implicit shape coding techniques have been proposed in which shape information is not explicitly coded. Rather, in implicit shape coding, the shape of each object can be ascertained based on the texture information. Implicit shape coding techniques provide a simpler design (less complex than explicit technique) and a reasonable performance, particularly at lower bit rates. Implicit shape coding reduces signal bandwidth because shape information is not explicitly transmitted. As a result, implicit shape coding can be particularly important for low bit rate applications, such as mobile and other wireless applications.

However, implicit shape coding generally does not perform as well as explicit shape coding, particularly for more demanding scenes. For example, objects often contain color bleeding artifacts on object edges when using implicit shape coding. Also, it can be difficult to obtain lossless shapes using the implicit techniques because shape coding quality is determined by texture coding quality and is not provided explicitly. Therefore, a need exists for an improved implicit shape coding technique.

SUMMARY OF THE INVENTION

The system of the present invention can include an encoding system and a decoding system that overcomes the disadvantages and drawbacks of prior systems.

In one embodiment of the present invention, shape information for an object is implicitly encoded by using a chroma-key color. According to this embodiment, a bounding box is created around the object and the pixels that are in the bounding box but outside the object are identified and replaced with a key color. The object is coded and a first bitstream is output that includes the coded data for the pixels in the bounding box. A scene description bitstream is sent that includes a node containing the key color and chroma-key thresholds for the object. In one embodiment, the node is a MaterialKey node. In a futher embodiment, the node comprises a transparency field, an isKeyed field, an isRGB field, a keyColor field, a lowThreshold field, and a highThreshold field. A decoding system decodes the object and bounding box containing the object, and assigns a value signifying transparent to each pixel for which the difference between the color of each of said decoded pixels and the key color is below or equal to a low threshold, and assigns a value signifying opaque to each pixel for which said difference is greater than a high threshold.

DETAILED DESCRIPTION

Figure 1A:
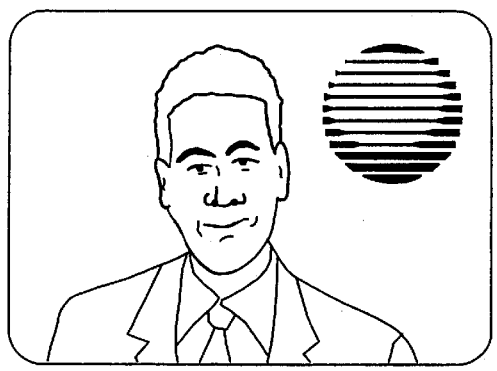
FIG. 1(A) illustrates an example frame for coding.
Figure 1B:
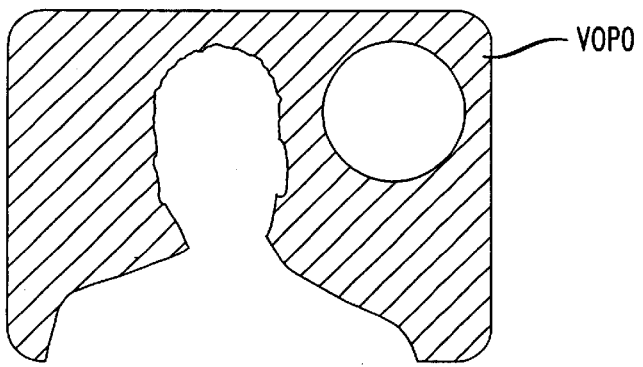
FIGS. 1(B)–1(D) illustrate the frame of FIG. 1(a) broken into three Video Object Planes.
Figure 1C:
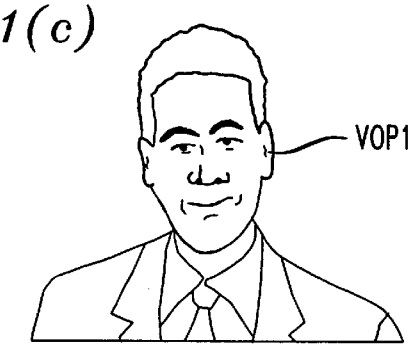
Figure 1D:
Figure 2A:
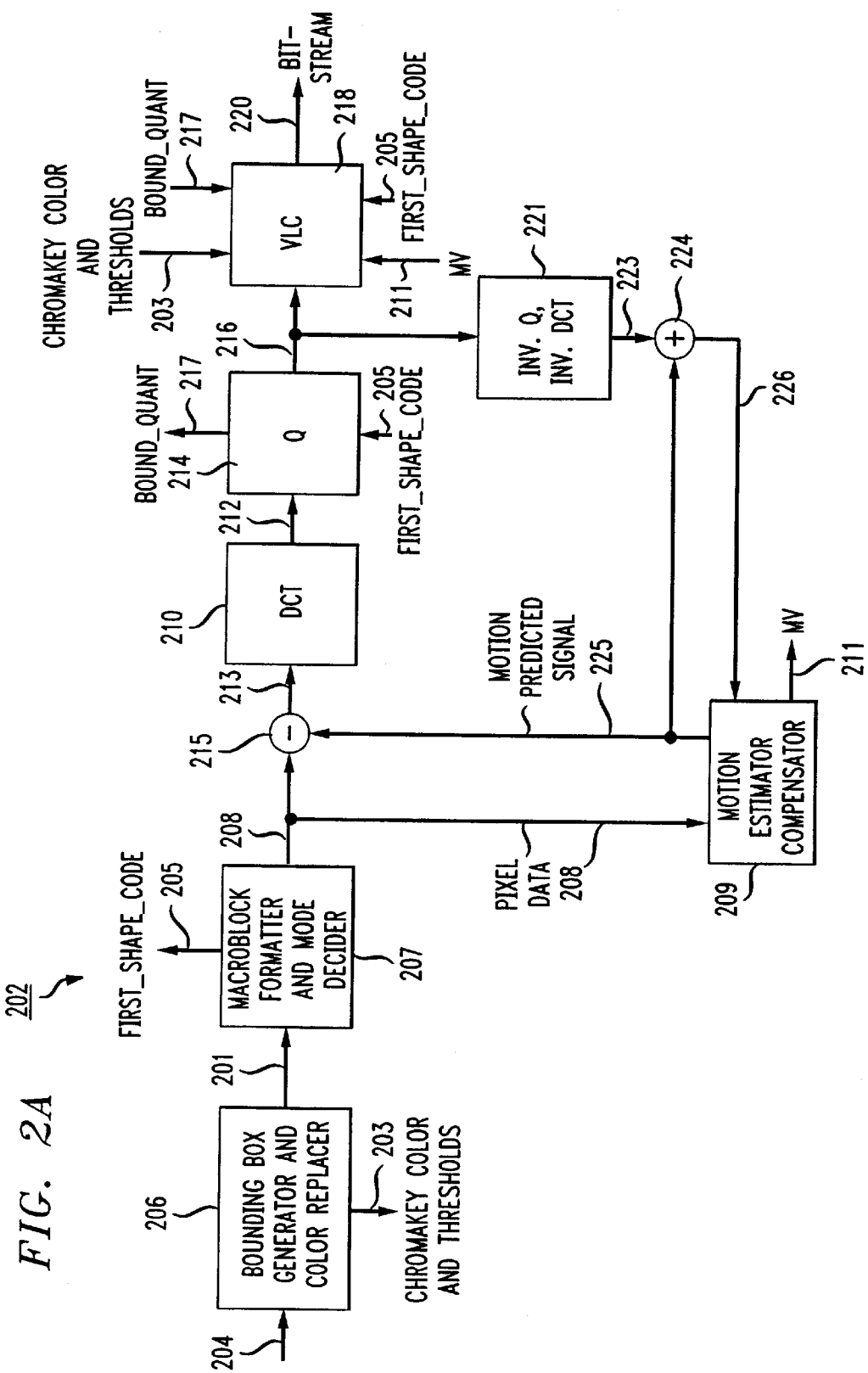
FIG. 2A is a block diagram illustrating an encoding system according to an embodiment of the present invention.
Figure 2B:
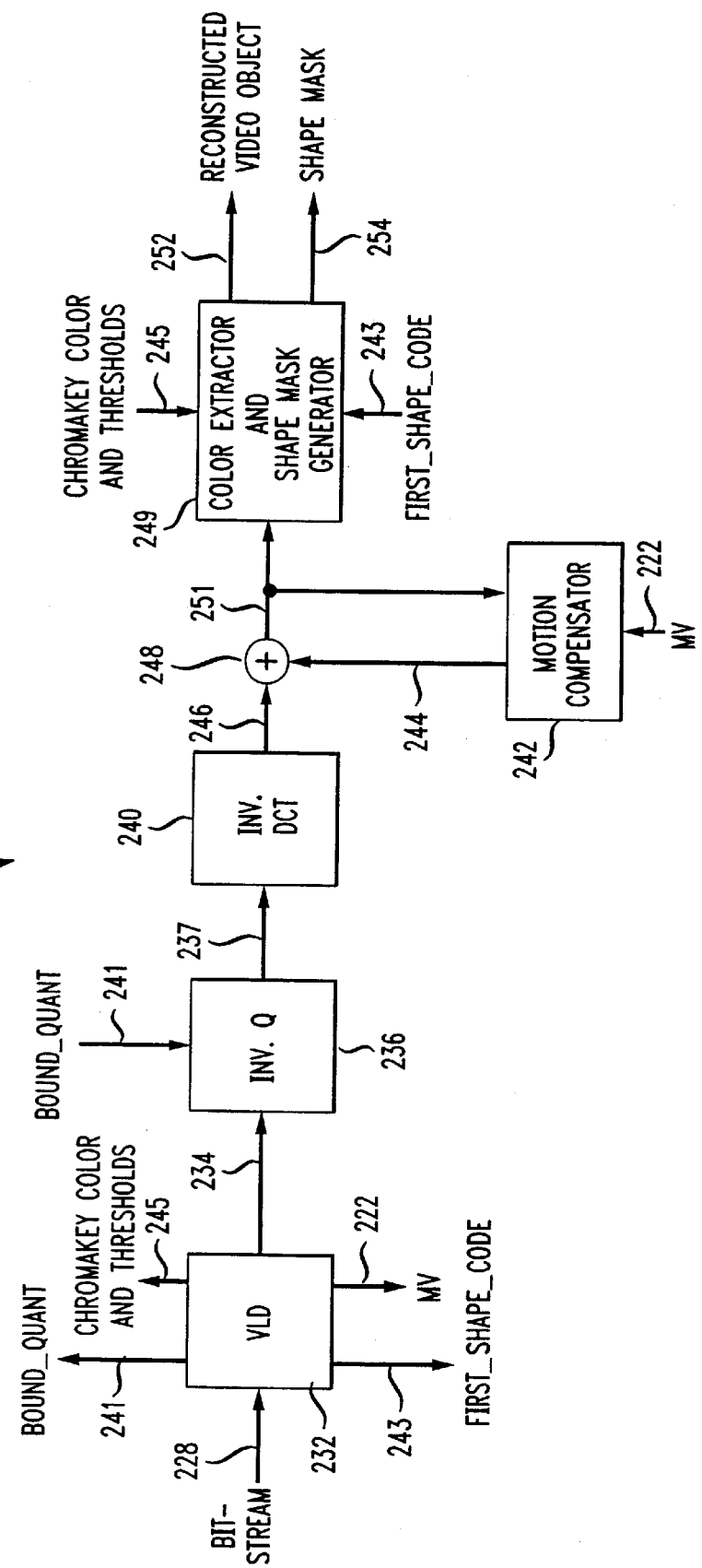
FIG. 2B is a block diagram of a decoding system according to an embodiment of the present invention.

Referring to the drawings in detail, wherein like numerals indicate like elements, FIG. 2A is a block diagram illustrating an encoding system according to an embodiment of the present invention. FIG. 2B is a block diagram of a decoding system according to an embodiment of the present invention.

Encoding system 202 uses chroma-key shape coding to implicitly encode shape information. According to the present invention, an encoding system 202 (FIG. 2A) receives a video picture or frame including a segmented video object as an input signal over line 204, representative of a VOP to be coded (e.g., includes the object and some background). The input signal is sampled and organized into macroblocks which are spatial areas of each frame. The encoding system 202 codes the macroblocks and outputs an encoded bitstream over a line 220 to a channel 219. The channel 219 may be a radio channel, a computer network or some storage media such as a memory or a magnetic or optical disk. A decoding system 230 (FIG. 2B) receives the bitstream over line 228 from the channel 219 and reconstructs a video object therefrom for display.

Encoding system 202 includes a bounding box generator and color replacer 206 for generating a bounding box around the segmented video object and for replacing pixel values located outside the object boundary with a predetermined key color (or chroma-key color) K, according to an embodiment of the present invention. The chroma-key color and some threshold values are output on line 203 by bounding box generator and color replacer 206. According to an embodiment of the present invention, instead of enclosing each video object in a full size picture and processing 15 all macroblocks in the received full size picture, the video object can advantageously be enclosed by a bounding box and only macroblocks in the bounding box are processed (e.g., only pixel data is passed for macroblocks inside the bounding box). According to an embodiment of the present invention, the position of the bounding box is chosen such that it contains a minimum number of 16 pixel×16 pixel macroblocks (while bounding the video object). As a result, processing time is reduced. In this manner, bounding box generator and color replacer 206 implicitly encodes information describing the shape of the video object in the texture (luminance and chrominance values) information for the object. According to an embodiment of the present invention, the bounding box generator and color replacer 206 outputs signals on line 201 including texture information (pixel values) for the object (for pixels inside the object boundary), and outputs the chroma-key pixel value for pixels outside the object boundary (because these pixels outside the object boundary were replaced with the chroma-key color).

The output of generator and color replacer 206 is coupled via line 201 to a macroblock formatter and mode decider 207. Macroblock formatter and mode decider 207 divides the video object into macroblocks (MBs), determines whether each MB is inside the boundary (of the video object), outside the boundary, or on the boundary (e.g., having pixels inside and pixels outside the boundary of the object), known as the mode. The macroblock formatter and mode decider 207 then outputs a first_shape_code for each macroblock identifying the mode of each macroblock.

In addition, according to an embodiment of the present invention, macroblock formatter and mode decider 207 also operates like a filter because it outputs pixel data on line 208 (to be encoded) only for macroblocks that are either inside the boundary or on the boundary (pixel data are not output for macroblocks outside the boundary). The first_shape_code is generated for each macroblock and identifies those macroblocks for which no pixel data is transmitted. Thus, data compression and encoding speed are improved because pixel data for macroblocks outside the boundary will not be encoded and transmitted.

The pixel data on line 208 (including texture information or pixel values for the pixels inside the object boundary, and the replaced chroma-key values for those pixels outside the object boundary and inside the bounding box) is input to a difference circuit 215 and to a motion estimator/compensator 209. Motion estimator/compensator 209 generates a motion predicted signal that is output on line 225. Difference circuit 215 subtracts the motion predicted signal (on line 225) and the pixel data (on line 208) to output pixel difference values on line 213.

The pixel (image) difference values are input to a DCT encoder 210 via line 213. DCT encoder 210 performs a transformation of the image data, such as discrete cosine transform ("DCT") coding or sub-band coding, from the pixel values (luminance and chrominance values) to DCT coefficients (frequency domain). A block of pixels is transformed to an equivalently sized block of DCT coefficients. DCT encoder 210 outputs DCT coefficients (corresponding to the pixel data) on line 212.

A quantizer 214 is connected via line 212 to DCT encoder 210. Quantizer 214 scales or quantizes the DCT coefficients output on line 212 by dividing each coefficient by a predetermined quantizer. The quantizer is a constant or variable scalar value ($Q_p$). For example, the DCT coefficients can be quantized by dividing each coefficient by the quantizer ($Q_p$). In general, the quantizer 214 reduces bandwidth of the image signal by reducing a number of quantization levels available for encoding the signal. The quantization process is lossy. Many small DCT coefficients input to the quantizer 214 are divided down and truncated to zero. The scaled signal (scaled or quantized DCT coefficients) is output from quantizer 214 via line 216.

Usually, the same quantizer (a VOP_quant) is used to quantize DCT coefficients for all macroblocks of a VOP.

However, according to an embodiment of the present invention, certain macroblocks (e.g. boundary macroblocks) can be quantized using a smaller quantizer to better define the boundary or edge of an object. A special quantizer for boundary macroblocks (indicated by bound_quant) is used for boundary macroblocks. The boundary quantizer is specified by the bound_quant signal, which is output on line 217 from quantizer 214.

An inverse quantizer and inverse DCT encoder (e.g., a DCT decoder) receives the scaled DCT coefficients via line 216, inverse quantizes the DCT coefficients and then converts the DCT coefficients to pixel values to generate the pixel difference values, output on line 223.

An adder circuit 224 receives as inputs, the pixel difference signal via line 223 and the motion predicted signal 225 (from motion estimator/compensator 209). Adder circuit 224 generates an approximate value of the input signal (provided on line 208). This approximation signal, output on line 226, is the current frame data and is input to motion estimator/compensator 209 to be used as a predictor for the next frame.

Motion estimator/compensator 209 performs motion estimation/compensation to output the motion predicted signal on line 225 and motion vectors (MV) based on the pixel data input on line 208 and the approximation of the pixel data input on line 226. Motion vectors (MV) for one or more macroblocks are output via line 211.

A variable length coder 218 variable length codes the scaled DCT coefficients (input on line 216), motion vectors (MVs input on line 211), the chroma-key color and thresholds (input on line 203) and the bound_quant value (input on line 217) into a bitstream. The bitstream is output via line 220 to channel 219 for transmission.

Decoding system 230 (FIG. 2B) receives the encoded bitstream from channel 219 via line 228. A variable length decoder 232 variable length decodes the encoded bitstream into scaled DCT coefficients (output on line 234) for each macroblock, motion vectors for each macroblock (MVs output on line 222), the first_shape_codes for each macroblock (output on line 243), the bound_quant value (output on line 241) and the chroma-key color and threshold values (output on line 245).

The scaled DCT coefficients are input via line 234 and the bound_quant value is input via line 241 to inverse quantizer 236. Inverse quantizer 236 rescales the DCT coefficients according to the quantizer which is a constant or variable scalar value ($Q_p$ or VOP_quant). For example, the coefficients can be rescaled by multiplying each coefficient by the quantizer ($Q_p$) (both the standard quantizer $Q_p$ and the bound_quant value can be transmitted with the bitstream). Inverse quantizer 236 increases a number of quantization levels available for encoding the signal (e.g., back to the original number of quantization levels). Inverse quantizer 236 may use one quantizer for macroblocks inside the boundary (e.g., VOP_quant), and a finer quantizer (bound_quant) for boundary macroblocks. The same quantizers used at the encoding system 202 are also used at the decoding system 230.

Inverse DCT encoder 240 performs an inverse DCT transform on the DCT coefficients received as an input via line 237 to output pixel values (luminance and chrominance values) for each macroblock on line 246.

For those macroblocks that were coded using motion compensation, the motion predicted signal provided on line 244 (output from motion compensator 242) is added by adder circuit 248 to the pixel values on line 246 to output the reconstructed pixel values for each macroblock on line 251.

Motion compensator 242 generates the motion predicted pixel signal on line 244 based on the reconstructed pixel signal on line 251 and the motion vectors for each macroblock received via line 222.

The reconstructed pixel signal is input via line 251 to a color extractor and shape mask generator 249. The color extractor and shape mask generator 249 also receives as inputs the chroma-key color and thresholds (via line 245) and the first_shape_code (via line 243). The color extractor and shape mask generator 249 compares each pixel value (in the reconstructed pixel signal) to the chroma-key value (or a range of values near the chroma-key color). By comparing the pixel values to the chroma-key value, the color extractor and shape mask generator 249 can determine which pixels are located within the object and which pixels are located outside of the object and thereby identify the original shape of the object in the VOP. The pixels located within the object are output via line 252 as a reconstructed video object (stripping off the chroma-key or background pixels to output object pixel values). Also, color extractor and shape mask generator 249 generates and outputs a shape mask identifying the shape of the video object. The shape mask can be generated as a binary map (e.g., a 1 or 0 for each pixel) or a gray scale map identifying whether each pixel is either inside or outside the video object. The shape mask is output via line 254 and can be used, for example, by a compositer to combine multiple video objects into a single (multi-object) frame.

The above-described chroma-key shape coding technique of the present invention provides a simple and efficient method for video shape coding. Furthermore, the present invention includes several additional features and advantages that further improve or refine the above-described chroma-key shape coding technique without adding unjustifiable overhead or complexity. The present invention can include one or more of the following features:

1. Bounding Box: Process Only Macroblocks Inside the Bounding Box:

Instead of enclosing each video object in a full size picture and processing all macroblocks in the picture, the video object can advantageously be enclosed by a bounding box and only macroblocks in the bounding box are processed. Prior to calculating a bounding box around the object, the object is first segmented from the video frame. Any of several well-known segmentation techniques can be used to segment the video object from the remainder of the video frame. The position of the bounding box is chosen such that it contains a minimum number of 16 pixel×16 pixel macroblocks. The encoding/decoding process is performed on a macroblock basis. In this manner, processing time can be reduced.

Figure 3:
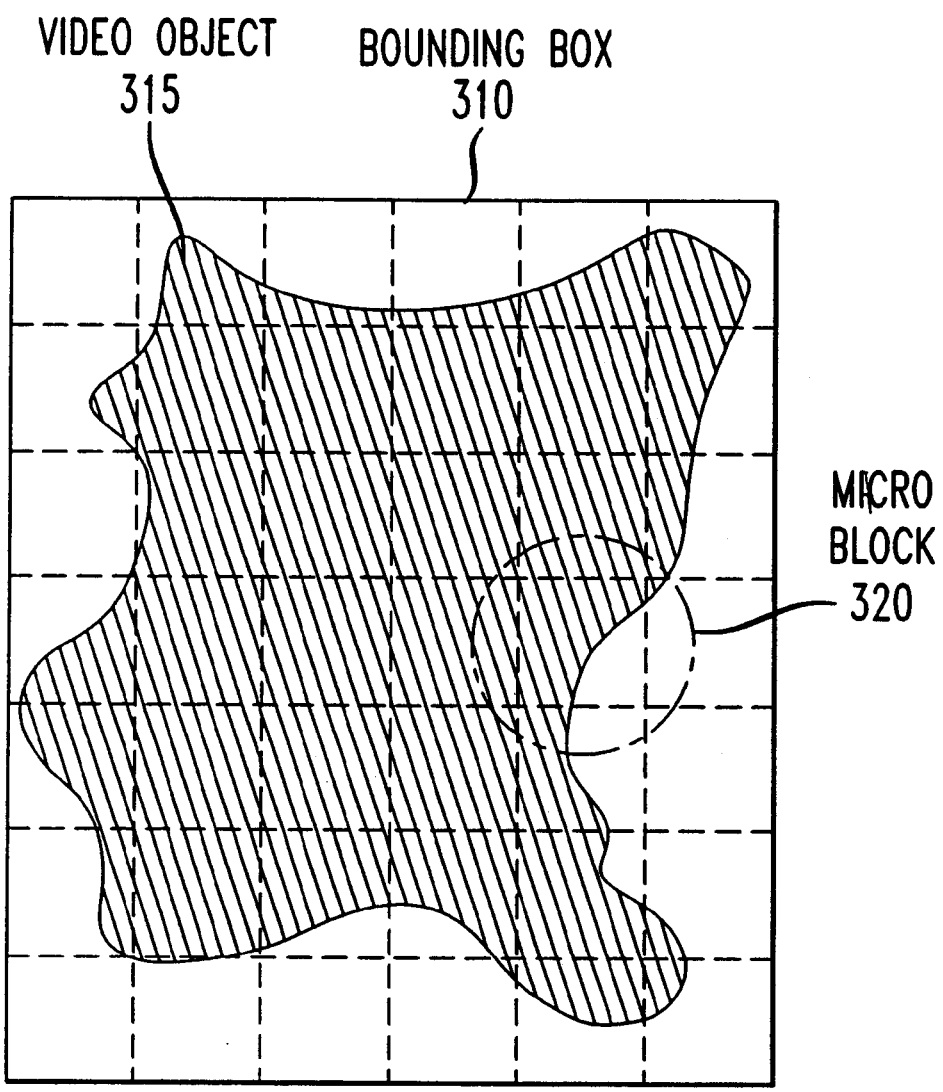
FIG. 3 illustrates an example of a bounding box bounding a video object according to an embodiment of the present invention.

FIG. 3 illustrates an example of a bounding box 310 that bounds a video object 315. The bounding box 310 is divided into a plurality of macroblocks 320. (This is similar to the bounding box used in the explicit shape coding of MPEG-4 Verification Model (VM).) As a result, macroblocks within the bounding box 310 are either 1) inside the object 315 (where the macroblock is completely inside the object); 2) outside the object 315 (where the macroblock is completely outside the object); or 3) on the object boundary (e.g., the macroblock has both pixel(s) inside the object and pixel(s) outside the object).

Figure 4:
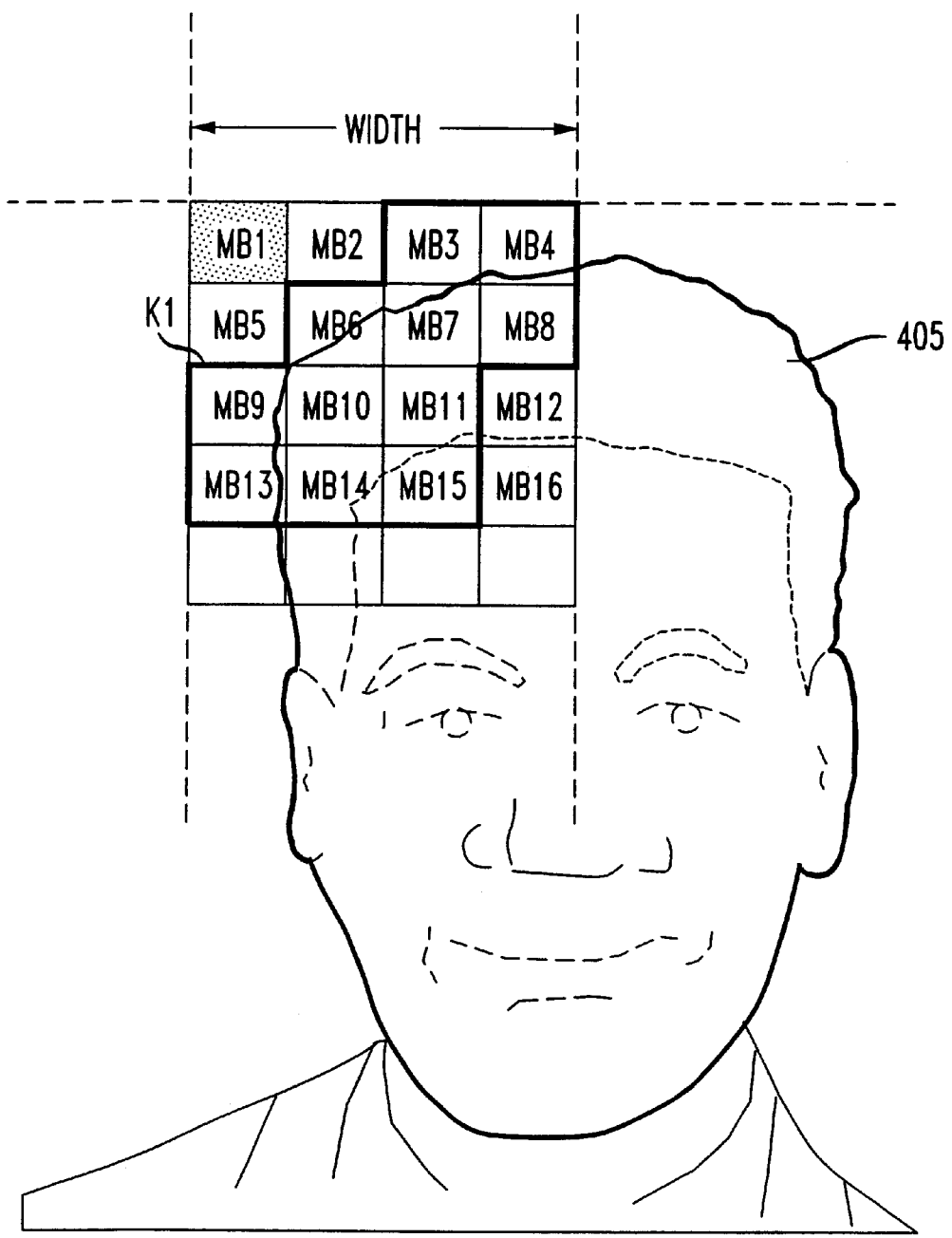
FIG. 4 illustrates an example of a video object according to an embodiment of the present invention.

FIG. 4 illustrates an example of a video object according to an embodiment of the present invention. Video object 405 is bounded by a bounding box (not shown). The bounding box is divided into a plurality of macroblocks. Some of the macroblocks are illustrated in FIG. 4. For example, macroblocks MB1, MB2 and MB5 are outside the video object 405. Macroblocks MB11, MB12 and MB14–16 are located inside the video object 405. Also, macroblocks MB3, MB4, MB6, MB7, MB9 and MB13 are on the object boundary.

2. First Shape Code:

For each macroblock in the bounding box, the present invention can use a first_shape_code to identify whether the macroblock is:

a) outside the object;

b) inside the object; or c) on the object boundary. A first_shape_code is transmitted with the data for each macroblock. (For those macroblocks outside the boundary, only the first_shape_code will be transmitted).

The first_shape_code can be implemented several different ways. Two examples of a first_shape_code are described below:

TABLE 1

| first_shape_code | Macroblock Shape |
| --- | --- |
| 0 | all_0 (outside the object) |
| 1 | others (inside or on boundary) |

In Table 1, first_shape_code is a 1 bit code that indicates whether the macroblock is outside the video object or not. A first_shape_code of 0 indicates that the macroblock is outside the object. A first_shape_code of 1 indicates that the macroblock is either inside the object or on the boundary.

TABLE 2

| first_shape_code | Macroblock Shape |
| --- | --- |
| 0 | boundary |
| 10 | all_0 (outside the object) |
| 11 | all_255 (inside the object) |

In Table 2, the first_shape_code is transmitted as a two bit code. The two bits can be used to identify whether the macroblock is located on the boundary, outside the object, or inside the object.

3. Within the Bounding Box, Apply Chroma-keying Only to Boundary Macroblocks: Background Macroblocks Are Not Coded:

For macroblocks on the boundary (identified, for example, by the first_shape_code), pixels outside the object (e.g., background pixels) are replaced with the chroma-key color. This chroma-key replacement of background pixels is performed only for boundary macroblocks. Replacing the background pixels in the boundary macroblocks with the chroma-key implicitly codes shape information for the object. Also, macroblocks outside the object (and within the bounding box) are not coded.

After chroma-key pixel replacement, only blocks inside the object or on the boundary are coded (e.g., DCT transformed, quantized, and variable length coded for transmission). By not coding macroblocks located outside the video object (background macroblocks), a significant number of overhead bits can be saved, thereby increasing data compression.

In addition, information should be sent identifying those macroblocks inside the bounding box and outside the object (and thus, identifying those macroblocks that were not coded). An additional bit can be added to the first_shape_code to identify those macroblocks that are within the bounding box but outside the object (identifying those macroblocks that are not coded).

4. Bound quant: Use a Finer Quantization for Boundary Macroblocks:

To further improve image quality, a finer quantization can be used for the boundary macroblocks, as compared to the quantization for the other macroblocks in the bounding box. This can be done by quantizer 214 (FIG. 2A) scaling or quantizing the DCT coefficients output on line 212 according to a smaller quantizer for the boundary macroblocks. Therefore, quantizer 214 uses a larger number of quantization levels (e.g., a smaller quantizer) for the boundary macroblocks resulting in finer quantization of the boundary macroblocks. Because bandwidth is limited, using a larger number of quantization levels (e.g., a quantizer less than 1) for the boundary macroblocks allocates or apportions a larger number of the available bits (bandwidth) to boundary macroblocks to better define the outer edge or boundary of the video object.

According to an embodiment of the present invention, a finer quantization for boundary blocks can be specified through a boundary quantization code (bound_quant). In MPEG-4 VM, a VOP quantization code (VOP_quant) is a five-bit code that specifies the quantization for the VOP. In MPEG-4, DCT coefficients are divided by the VOP quantization code. According to the present invention, the background macroblocks within the bounding box are not coded. Therefore, according to an embodiment of the present invention, VOP_quant specifies the number of quantization levels for macroblocks inside the object and bound_quant specifies the number of quantization levels for boundary macroblocks.

According to an embodiment of the present invention, the bound_quant code can be used to specify the level of quantization for boundary macroblocks relative to the level of quantization for the other macroblocks, as follows:

TABLE 3

| bound_quant | times VOP_quant |
| --- | --- |
| 00 | ½ |
| 01 | ⅝ |
| 10 | ⅞ |
| 11 | 1 |

In Table 3, a bound_quant code indicates the quantization parameter for boundary macroblocks as compared to the quantization parameter of other macroblocks. For example, a bound_quant of 11 indicates that the quantization parameter for boundary macroblocks is the same as (one times) the quantization parameter for other macroblocks in the bounding box (the VOP_quant). This indicates that there are the same quantization parameter for the boundary macroblocks as for other macroblocks.

A bound_quant code of 00 similarly indicates that the quantization parameter is one half for the boundary macroblocks as for other macroblocks resulting in finer quantization of the boundary macroblocks. Other values for the bound_quant code specify various other number of quantization parameters for boundary macroblocks. Other techniques can be used to specify an increased number of quantization levels (finer quantization) for boundary macroblocks (as compared to other macroblocks).

5. Choice of Chroma-key Color:

Although the choice of key color is an encoding issue, it has the potential of causing shape degradation due to potential color leakage if saturated colors are used. (Saturation is the degree of purity of a color; for example, a pure spectral color having a single wavelength has a saturation of 100%, while white light has a saturation of zero). On the other hand, use of a saturated color improves shape recovery because natural scenes do not often contain such colors. However, the only restriction for chroma-keying is that the chroma-key color does not exist in the scene. The use of less saturated colors has been investigated, similar to the ones used in studio environments for chroma-keying of scenes.

A relatively saturated color can be used, such as Y=50, Cb=200, Cr=100. However, weaker colors (less saturated) can be used to reduce the potential for shape distortion due to color bleeding. According to an embodiment of the present invention, an example of a less saturated color that can be used to decrease the potential for color bleeding is Y=135, Cb=160, Cr=110. Other less saturated colors can be similarly used as the chroma-key color to decrease the potential for shape distortion. For notational simplicity, instead of using Cb and Cr, the notations of U and V, respectively, will be used in the remainder of this application (although strictly speaking Cb and Cr differ from U and V by a small scaling factor and an offset).

6. Transmitting Chroma-key Color, Thresholds, and Associated Data as a MaterialKey Node:

In one embodiment, the chroma-key color, thresholds and associated data for a video object are transmitted by the encoder to the decoder in an MPEG-4 BInary Format for Scenes (BIFS) node, which are the fundamental scene graph elements that describe audio-visual primitives and their attributes, along with the structure of the scene graph itself. MPEG-4 nodes are described in the MPEG-4 Standard ISO/IEC, 14496-1, incorporated herein by reference. In one embodiment, the node is included in a scene description bitstream. In this embodiment, the scene description bitstream is separate from the bitstream containing the data.

In a further embodiment, the chroma-key color, thresholds and associated data are transmitted as a field in a Material node, which is a field in an Appearance node, which is a field in the Shape node. Material nodes are generally used to specify the character of the associated geometry node, such as for example its color, how it reflects light, and how transparent it is. In one embodiment, the chroma-key color, thresholds and associated data are transmitted as a MaterialKey node. MaterialKey is a type of material node. The MaterialKey node can be defined as follows:

```
MaterialKey {
    exposedField   SFFloat    transparency     0
    exposedField   SFBool     isKeyed          TRUE
    exposedField   SFBool     isRGB            TRUE
    exposedField   SFColor    keyColor         0, 0, 0
    exposedField   SFFloat    highThreshold    0
    exposedField   SFFloat    lowThreshold     0
}
```

The transparency field is a floating point value that specifies how this video object occludes the other objects in the scene. As an exposedField, the value can be written from or read to. This is the case for all of the fields in MaterialKey because they are all exposedFields. The last column in the node definition contains the initial value of the field. The value of transparency is initialized to 0, indicating that there is no transparency through the associated object.

The isKeyed field contains a boolean value that specifies whether the associated video object is chroma-keyed. If not, then the shape has not been implicitly encoded and chroma-key decoding is not performed for the video object. The value of isKeyed is initialized to TRUE.

The isRGB field contains a boolean value that specifies the data format used to represent the object's color. The value of isRGB is initialized to TRUE. When isRGB is set to TRUE, then the pixels are in RGB format. When isRGB is set to FALSE, then the pixels are in YUV format.

The keyColor field specifies the reference color used for keying the video object. Because it is an SFColor structure, it has three values. It contains three components, $c_1$, $c_2$, and $c_3$. $C_1$ contains the normalized value of the G (or U) component of the key color. $c_2$ contains the normalized value of the R (or Y) component of the key color. $c_3$ contains the normalized value of the B (or V) component of the key color. All three values are in the range from 0.0 to 1.0.

The lowThreshold and highThreshold fields specify the allowed bounds on keyColor for a detected color to be identified as the key color.

In operation, chroma-key shape encoding using the MaterialKey node starts by filing the key color in the region outside of the object but within the bounding box. The key color used to fill this region is the color stored in the keycolor field of the MaterialKey node. Because the video object is chroma keyed, the isKeyed field in the MaterialKey node is set to true. If the pixels in the video object are in the RGB color format, then the RGB field in MaterialKey is set to true. If RGB format is not used, then the RGB field is set to false. Next, the video object in the bounding box is coded as is normally done in video coding using standards such as H.263, MPEG-1, MPEG-2 or MPEG-4 (without shape encoding). Because the video object has been chroma keyed, the isKeyed field in the MaterialKey node is set to true. The coded video object and the MaterialKey node are then transmitted by the MPEG-4 systems stream.

Decoding of a key colored video object (i.e., where the isKeyed field in the MaterialKey node is set to true) starts by doing normal decoding of the video object. In one embodiment, the transparency value for each pixel is calculated by determining the distance between the unnormalized key color ($C_1$, $C_2$, $C_3$) and the color of the pixel ($X_1$, $X_2$, $X_3$). The respective unnormalized values of $c_1$, $c_2$, and $c_3$ are obtained by multiplying $c_1$, $c_2$, and $C_3$ by k, where $k=2^n-1$. For b=8 bit video, k=255. A factor K=3×k can be precomputed and stored. T=the transparency value assigned to the opaque region. In one embodiment, T is in the range from 0.0 to 1.0

The values $c_1$, $c_2$, and $C_3$ are the values stored in the keyColor field of the MaterialKey node. The distance d between the unnormalized key color and the color of each pixel is $d=(|C_1-X_1|+|C_2-X_2|+|C_3-X_3|\times T/K)$. The resulting normalized value lies in the range of 0.0 to 1.0. The alpha value for each pixel is determined by comparing the distance d with the values in the lowThreshold and highThreshold fields of the MaterialKey node. The following graph shows the alpha value as a function of the distance measure.

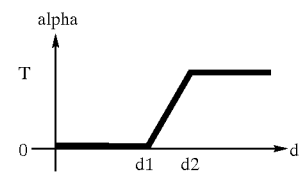

If $d \leq$ the value of lowThreshold (d1), then the alpha value is 0.0 and the pixel is transparent. If d>the value of highThreshold (d2), then alpha=1.0 and the pixel is opaque. If $d1<d\leq d2$, then $alpha=(d-d1)/(d2-d1)/T$. In one embodiment, the value of lowThreshold and highThreshold are the same, implying a binary shape.

In another embodiment, the chroma-key color, thresholds and associated data are transmitted as a field in a texture node, which are generally used to specify the texture of the video object and how the texture is mapped onto the surface of the video object. In one embodiment, the chroma-key color, thresholds and associated data are stored in a VideoObjectKeyed2D node, one definition of which is as follows:

```
VideoObjectKeyed2D {
    exposedField    SFFloat    loop            FALSE
    exposedField    SFFloat    speed           1
    exposedField    SFTime     startTime       0
    exposedField    SFTime     stopTime        0
    exposedField    MFString   url             0
    exposedField    SFBool     isActive        0
    exposedField    SFBool     isKeyed         TRUE
    exposedField    SFBool     isRGB           FALSE
    exposedField    SFInt      Y_G             0
    exposedField    SFInt      U_R             0
    exposedField    SFInt      V_B             0
    exposedField    SFFloat    highThreshold   0
    exposedField    SFFloat    lowThreshold    0
}
```

In VideoObjectKeyed2d, the isKeyed, isRGB, highThreshold, and lowThreshold fields are the same as in the MaterialKey node discussed above. The Y_G, U_R, and V_B fields are analogous to the keyColor field in the MaterialKey node. The loop field is used to signify whether the video object is to be replayed in a loop. The speed field specifies how fast the video object is played. The strartTime and stopTime fields contain a time when the video object should start playing and stop playing. The url field contains the universal resource locator of the stream that defines the video. The isActive field allows you to turn the video object on or off.

Figure 5:
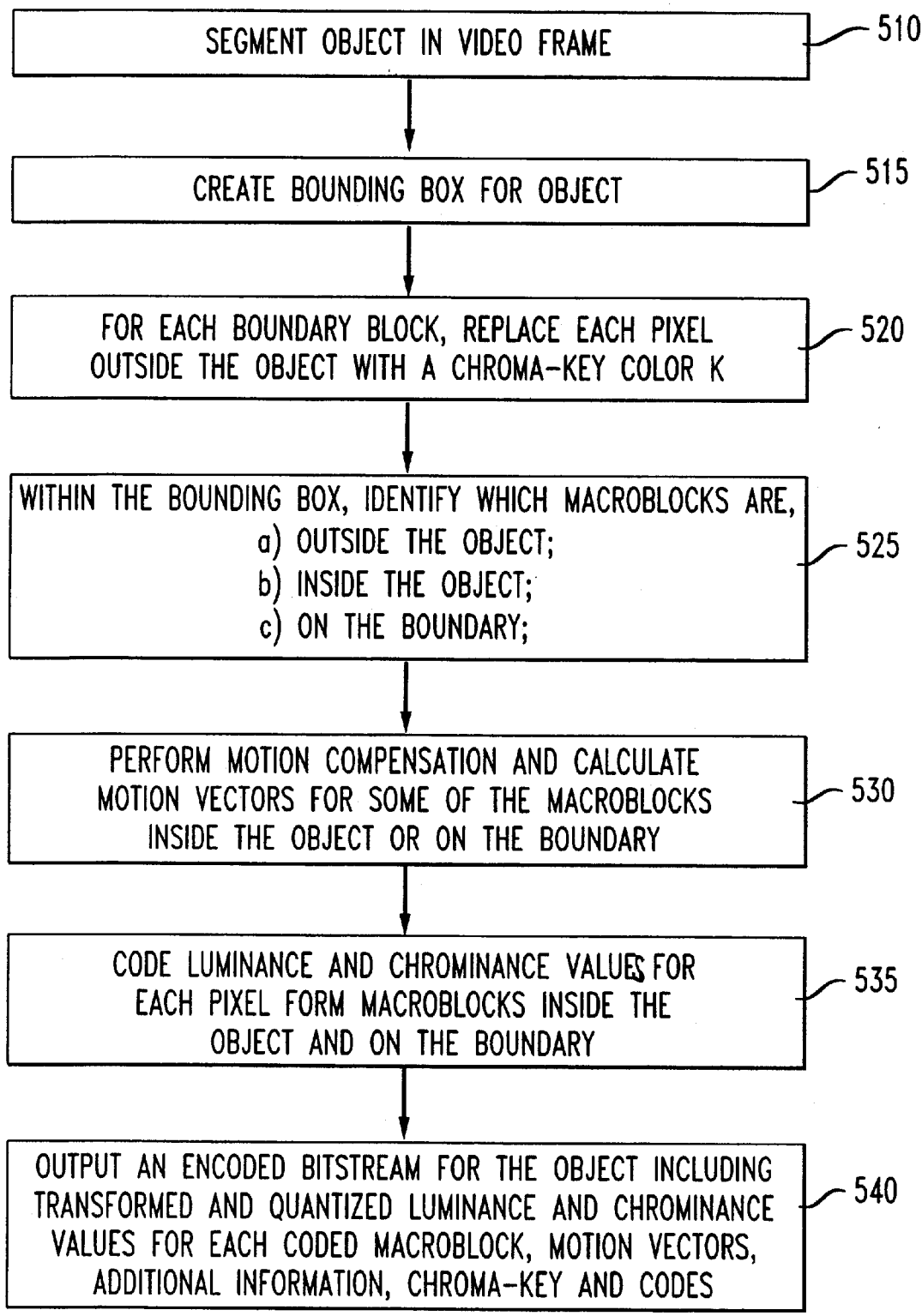
FIG. 5 is a flow chart illustrating the operation of an encoding system according to an embodiment of the present invention.

FIG. 5 is a flow chart illustrating the operation of an encoding system according to an embodiment of the present invention.

At step 510 a video frame is received and a video object is segmented from the remainder of the video frame. One of several well known techniques can be used to segment the object.

At step 515, a bounding box is created around the video object (VOP). The position of the bounding box is chosen such that it contains a minimum number of 16 pixel×16 pixel macroblocks. Other size macroblocks can be used. Processing is performed on a macroblock basis.

At step 520, each background pixel (pixels outside the object) is replaced with the chroma-key color K. This can be performed for all pixels in the picture or frame or performed only for boundary macroblocks.

At step 525, within the bounding box, each macroblock formatted and is identified as either: 1) outside the video object (a background macroblock); 2) inside the object; or 3) on the object boundary. A code for each macroblock, such as the first_shape_code, is used to identify the position of each macroblock (inside, outside or on the object boundary).

At step 530, motion compensation is performed on at least some of the boundary or inside macroblocks, including calculating motion vectors. Motion vectors are calculated only for those macroblocks coded with motion compensation.

At step 535, the luminance and chrominance (pixel) values for boundary macroblocks and macroblocks located inside the object are coded. According to the present invention, macroblocks outside the object (e.g., background macroblocks) are not coded. Thus, in the event that all pixels (including pixels outside the bounding box) were replaced with the chroma-key at step 520, these replaced pixels located outside the bounding box are simply discarded (but the first_shape_codes indicate which macroblocks have no data transmitted for them). Coding includes DCT transforming the luminance and chrominance values for the macroblocks to obtain DCT coefficients, and then quantizing (scaling) the DCT coefficients. The motion vectors and the scaled DCT coefficients are then variable length coded. The steps of DCT transforming, quantizing (generally), performing motion compensation, calculating motion vectors and variable length coding can be performed, for example, in a manner similar to that set forth in MPEG-4 VM 5.0. According to an embodiment of the present invention, boundary macroblocks can be quantized using finer quantization than macroblocks inside the object.

At step 540, a coded bit stream is output from the encoding system to the channel. The bit stream includes the transformed and quantized (scaled) luminance and chrominance data for each coded macroblock, motion vectors, codes (such as the first_shape_code) identifying the position or mode (e.g., inside, outside or on the boundary) of each macroblock, a code (such as the VOP_quant code) indicating the level of quantization for macroblocks located inside the object and a code (such as the bound_quant code) indicating the relative level of quantization for boundary macroblocks (if different), motion vectors, and the chroma-key and threshold values. The bit stream can also include additional information. For boundary macroblocks, pixels located outside the object have been replaced with the chroma-key color so as to implicitly code the shape of the object within the texture information (luminance and chrominance data) for the object.

To reduce overhead and improve data compression, macroblocks located outside the object (e.g., background macroblocks) are not coded, and the chroma key is applied to background pixels only for boundary macroblocks. In addition, a finer quantization can be used for boundary macroblocks to improve image quality.

Figure 6:
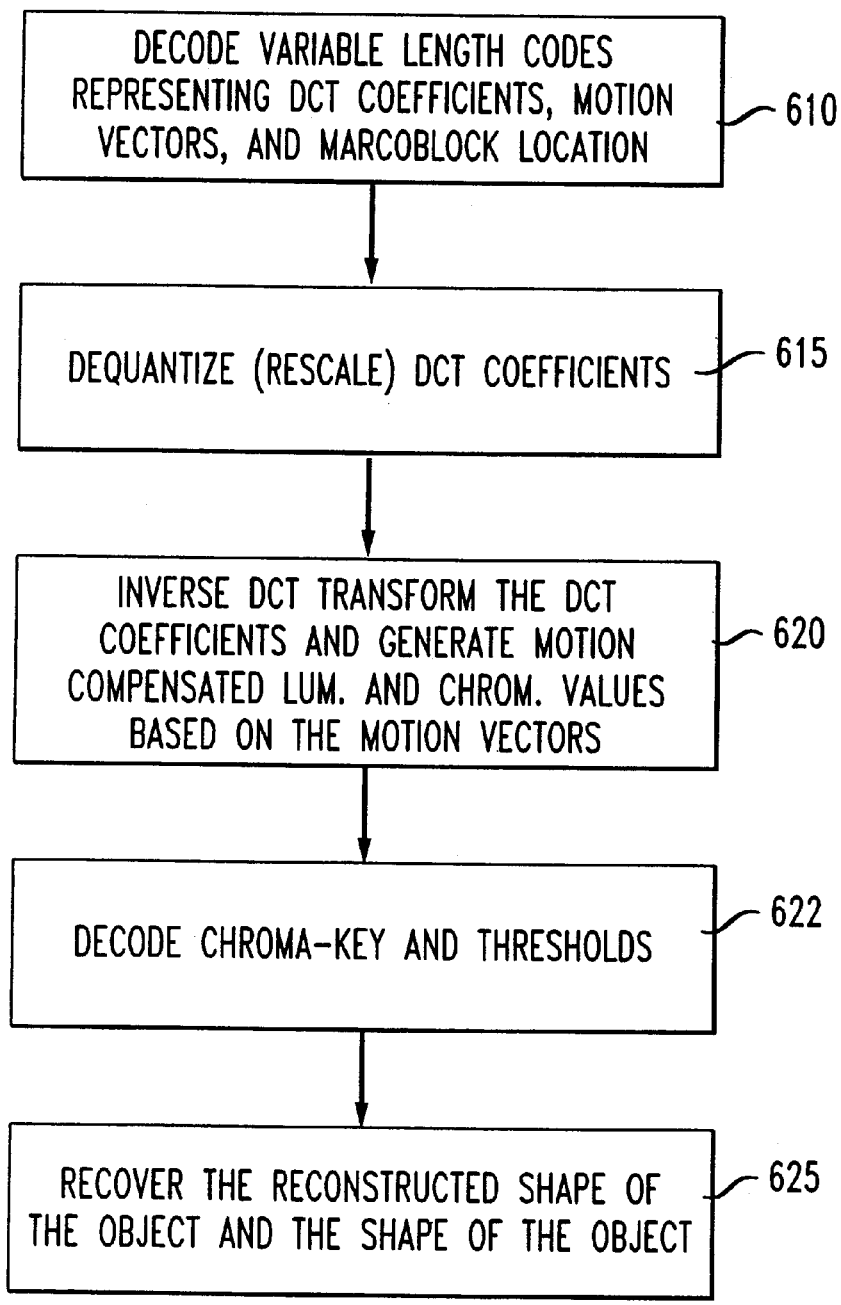
FIG. 6 is a flow chart illustrating the operation of a decoding system according to an embodiment of the present invention.

FIG. 6 is a flow chart illustrating the operation of a decoding system according to an embodiment of the present invention.

At step 610, the bit stream is received from the channel, and the variable length codes are decoded to obtain the scaled DCT coefficients, motion vectors (MVs), codes identifying the location or mode of macroblocks (e.g., first_shape_code), quantizers (e.g., VOP_quant, bound_quant), and chroma-key color and thresholds. Image data is not provided for the identified background macroblocks.

At step 615, the data (including DCT coefficients and motion vectors) for each macroblock is inverse quantized (rescaled) based on the bound_quant code (for boundary macroblocks) and the VOP_quant code (for macroblocks inside the object).

At step 620, the DCT coefficients are inverse DCT transformed, and motion compensation is performed based on the motion vectors (for those macroblocks coded with motion compensation) to generate motion compensated luminance and chrominance pixel values for macroblocks inside the object and on the object boundary. This can be performed, for example, as specified by MPEG-4 VM.

At step 622, the chroma-key and thresholds (described in greater detail in the example below) are decoded.

At step 625, the reconstructed video object is recovered, and the shape of the object is recovered. The reconstructed video object can be recovered by passing only pixel values that are not equal to the chroma-key color (or not within a small range of the chroma-key color. This passes only the object pixel data.

Object shape information can be recovered by generating a shape mask or a segmentation map, indicating which pixels are part of the object, and which pixels are not. According to an embodiment of the present invention the segmentation map can be generated as a binary segmentation map. The binary segmentation map can be generated by determining whether or not each pixel value is near the chroma-key value K. If a pixel is near the chroma-key value (e.g., within a threshold T of the chroma-key value), then the pixel is not included in the recovered video object or frame. If the pixel is not near the chroma key value (e.g., the pixel value is not within a threshold of the chroma-key value), then the pixel is included in the recovered video object (considered foreground). The video object has the shape indicated by the binary segmentation map and a texture (luminance and chrominance values) indicated by those decoded pixel values which are not near the chroma-key value. If the first_shape_code indicates which macroblocks are on the object boundary, then color extraction (e.g., comparison of the pixel to the chroma-key to determine if the pixel is inside or outside the boundary) need only be performed for boundary macroblocks to obtain a binary map identifying the shape of the object.

One problem with the use of a single threshold T to generate a binary segmentation map at the decoder for chroma-keying is that the sharp boundary condition can cause a rough or jagged edge for the object boundary. Instead of a binary map as described above, the segmentation map can have gray-level values to create softer boundaries. In computer graphics or in blue-screen movies, alias-free natural looking boundaries can be generated using two thresholds instead of one at the boundary regions.

According to another embodiment of the present invention, instead of using a single threshold T at the decoding system, two thresholds $T_1$ and $T_2$ can be used. The region between $T_1$ and $T_2$ is the boundary. A value of 0 indicates background and a value of 255 indicates foreground (the object), assuming 8 bits of coding per pixel (merely as an example). Note that $T_1$ affects the amount of background while T2 affects the amount of foreground. If $T_2$ is too high, part of the foreground will be too high. If $T_1$ is too low, part of the background will be included in the object, and hence introduce artifacts. On the other hand, if $T_1$ and $T_2$ are too close to each other, then the object boundary becomes harder (losing the advantages of boundary softening). The tradeoffs among these factors can be used to select the best thresholds for a particular application. For example, human interaction and subjective determinations can be used at the encoding system to select the thresholds $T_1$ and $T_2$. $T_1$ can be set equal to $T_2$ to create the step function or sharp boundary condition provided by the binary segmentation map.

Using two thresholds $T_1$ and $T_2$, the shape information can be recovered from the reconstructed texture information as follows:

1) Calculate an alpha value for a decoded pixel (X) by either of two methods:

Method 1: $d=(K_Y-X_Y)^2+(K_U-X_U)^2+(K_V-X_V)^2$; default method

Method 2: $d_1=|K_Y-X_Y|+|K_U-X_U|+|K_V-X_V|$; alternate method.

If method 2 is employed '$d_1$' needs to be multiplied by a scaling factor ($\leq d$) to fit the same range as 'd' computed by method 1, with respect to which thresholds $T_1$ and $T_2$ are sent.

2) The alpha value (a) for each pixel is a function of distance d between the reconstructed YUV values of pixel X and the key color K:

if $(d<T_1)$ then $\alpha=0$;

else if $(T_1<d<T_2)$ then $\alpha=(d-T_1)/(T_2-T_1) \times 255$;

else if $(d>T_2)$ then $\alpha=255$.

The values $T_1$ and $T_2$ are set by the encoder (assuming method 1 for computing d) and sent to the decoder as side information. According to an embodiment of the present invention, $\alpha$ can denote the transparency of a pixel, where a being 255 indicates that the object is opaque, and $\alpha$ being 0 indicates that the object is transparent. The resulting value for a pixel that has an $\alpha$ somewhere between 0 and 255 is semi-transparent and is a weighted combination of the pixel value in the current picture and the pixel value from a background picture that is specified externally or in advance. This allows a smoothing or blending function to be performed at object boundaries. Thus, the resulting pixel value for each component (Y, U and V) can be calculated as:

$[\alpha \cdot X+(255-\alpha) \cdot Z]/255$ where X is the decoded pixel component value ($X_Y$, $X_U$ or $X_V$), and Z is the pixel component value ($Z_Y$, $Z_U$ or $Z_V$) for each component of the background picture. This calculation should be performed for each component value (Y, U, V).

The system of the present invention can include an encoding system 202 and a decoding system 230. Encoding system 202 uses chroma-key shape coding to implicitly encode shape information. Encoding system 202 includes a bounding box generator and color replacer 206, a macroblock formatter and mode decider 207, a DCT encoder 210, a quantizer 214, a motion estimator/compensator 209 and a variable length coder 218. A video object to be encoded is enclosed by a bounding box and only macroblocks in the bounding box are processed. The position of the bounding box is chosen such that it contains a minimum number of macroblocks. The encoding/decoding process is performed macroblock by macroblock. To increase data compression, macroblocks outside the bounding box are not coded.

A code can be used to identify each macroblock inside the bounding box as either 1) outside the object; 2) inside the object; or 3) on the object boundary. For boundary macroblocks, pixels located outside the object (e.g., background pixels) are replaced with a chroma-key color K to implicitly encode the shape of the object. The luminance and chrominance values for macroblocks inside the object and on the boundary are coded. Coding includes, for example, transforming the luminance and chrominance values to obtain DCT coefficients, and quantizing (scaling) the DCT coefficients. Motion compensation can also be performed on macroblocks to generate motion vectors. In addition, boundary macroblocks can be quantized at a finer level to improve image quality. A bitstream is output from encoding system 202. The bitstream includes the transformed and quantized (scaled) luminance and chrominance data for each coded macroblock, motion vectors, codes (such as the first_shape_code) identifying the position (e.g., inside, outside or on the boundary), a quantizer code (such as the VOP_quant code) indicating the number of quantization levels for macroblocks located inside the object and a quantizer code (such as the bound_quant code) indicating the number of quantization levels for boundary macroblocks (if different).

Decoding system 230 includes a variable length decoder 232, an inverse quantizer 236, a motion compensator 242, an inverse DCT 240, and a color extractor and shape mask generator 249. A bitstream is received and decoded by decoding system 230 is used to obtain both texture information (e.g., luminance and chrominance data) and shape information for a video object. The shape information is implicitly encoded. DCT coefficients and motion vectors for each macroblock are requantized (rescaled) based on the bound_quant code (for boundary macroblocks) and the VOP_quant code (for macroblocks inside the object). Motion compensated luminance and chrominance values are generated based on the motion vectors. A color extractor and shape mask generator 249 reconstructs the video object by passing only pixel values that are different from the chroma-key color, and generates a shape mask (identifying the shape of the object), also by comparing pixel values to the chroma-key color. These two processes can be performed together. The shape of the object (and thus, an identification of the object itself) can be determined by comparing each pixel value with the chroma-key value K. If a pixel is within a predetermined threshold of the chroma-key value, the pixel is not included in the recovered video object or frame (rather, it is considered background). If the pixel is not within a threshold of the chroma-key value, then the pixel is included in the recovered video object (considered foreground). The shape of the video object is thus recovered (e.g., by generating a binary shape mask at the decoding system based on the pixel value comparison). For example, the binary shape mask can be generated as 1s for object data and 0s for the other (background) pixels. The texture of the object is recovered as the decoded luminance and chrominance values of the object (e.g., pixel values outside the threshold of the chroma-key value are output as texture data of the object). Also, a gray-scale segmentation map can be generated using two thresholds to soften the object boundaries.

What is claimed is:

1. A method of implicitly encoding shape information for an object, comprising the steps of:

receiving a frame, including an object;

creating a box bounding the object, the bounding box comprising a rectangular area containing a plurality of pixels;

identifying which pixels in the bounding box are outside the object;

replacing each of said pixels outside the object with a key color;

coding the object;

generating a node containing the key color and chroma-key thresholds for the object;

outputting a first bitstream including the coded data for the pixels in said bounding box; and outputting a scene description bitstream including said node.

2. The method of claim 1, wherein said node is a MaterialKey node.

3. The method of claim 1, wherein said object is a video object.

4. The method of claim 1, wherein said object is an image object.

5. The method of claim 2, wherein said MaterialKey node comprises a transparency field, an isKeyed field, an isRGB field, a keycolor field, a lowThreshold field, and a highThreshold field.

6. The method of claim 5, wherein said isKeyed field specifies whether the object is color keyed.

7. The method of claim 5, wherein said isRGB field is set to true when the data format used to represent the color for the pixels is RGB.

8. The method of claim 5, wherein values in said keyColor field characterize the coded color for each pixel.

9. The method of claim 5, wherein said lowThreshold field contains a value representing a transparent pixel and said highThreshold field contains a value representing an opaque pixel.

10. The method of claim 1, wherein said wherein texture node is a VideoObjectKeyed2D node.

11. A method of decoding a bitstream in which the shape of an object has been implicitly encoded, comprising the steps of:

receiving a first bitstream including coded data for pixels in a box portion of a frame, said box portion containing an object;

receiving a scene description bitstream including a node containing the key color and chroma-key thresholds for the object;

decoding the pixel data for said box including said object;

determining the difference between the color of each of said decoded pixels and the key color;

assigning a value signifying transparent to each pixel for which the difference is below or equal to a low threshold; and assigning a value signifying opaque to each pixel for which the difference is greater than a high threshold.

12. The method of claim 11, wherein said node is a MaterialKey node.

13. The method of claim 11, wherein said object is a video object.

14. The method of claim 11, wherein said object is an image object.

15. The method of claim 12, wherein said MaterialKey node comprises a transparency field, an isKeyed field, an isRGB field, a keyColor field, a lowThreshold field, and a highThreshold field.

16. The method of claim 15, wherein said isKeyed field specifies whether the object is color keyed.

17. The method of claim 15, wherein said isRGB field specifies the data format used to represent the color for the pixels.

18. The method of claim 15, wherein values in said keyColor field characterize the coded color for each pixel.

19. The method of claim 15, wherein said lowThreshold field contains a value representing a transparent pixel and said highThreshold filed contains a value representing an opaque pixel.

20. The method of claim 11, wherein texture node is a VideoObjectKeyed2D node.

21. A method of implicitly encoding shape information for an object, comprising the steps of:

receiving a video frame, including a video object;

creating a box bounding the video object, the bounding box divided into a plurality of macroblocks, each macroblock comprising a plurality of pixels;

creating a node including at least a key color and chroma-key thresholds for the video object;

identifying which macroblocks are inside the object or on the object boundary;

for each boundary macroblock, replacing each pixel outside the object with a key color;

for boundary macroblocks and macroblocks inside the object, computing luminance and chrominance pixel difference values by subtracting motion compensated prediction signals from the corresponding luminance and chrominance pixel values;

for boundary macroblocks and macroblocks inside the object, transforming the luminance and chrominance pixel difference values to frequency domain coefficients;

scaling the frequency domain coefficients for macroblocks inside the object using a first quantizer;

scaling the coefficients for boundary macroblocks using a second quantizer to provide a finer level of quantization for said boundary macroblocks as compared to said macroblocks inside the object; and outputting a first bitstream the scaled coefficients and information identifying the quantizers;

output a scene description bitstream including said node.

22. The method of claim 21, wherein said node is a material type node.

23. The method of claim 21, wherein said node is a MaterialKey node.

24. The method of claim 23, wherein said material type node comprises a transparency field, an isKeyed field, an isRGB field, a keycolor field, a lowThreshold field, and a highThreshold field.

25. The method of claim 21, wherein said node is a texture node.

26. The method of claim 25, wherein said texture node is a VideoObjectKeyed2D node.

27. A method of decoding a video bitstream in which the shape of a video object has been implicitly encoded, comprising the steps of:

receiving a first bitstream representing a video object, the bitstream including scaled frequency domain coefficients for each of a plurality of macroblocks inside the object or on the object boundary;

receiving a scene description bitstream including a node containing the key color and chroma-key thresholds for the video object;

rescaling the coefficients for macroblocks inside the object using a first quantizer;

rescaling the coefficients for macroblocks on the object boundary using a second quantizer wherein the second quantizer is smaller than or equal to the first quantizer;

inverse transforming the frequency domain coefficients to obtain chrominance pixel difference values;

adding a prediction signal generated by a motion compensator to the luminance and chrominance pixel difference values to obtain the luminance and chrominance pixel values of a reconstructed video object; and recovering the approximate shape of the object by analyzing the luminance and chrominance values of at least the boundary macroblocks of the reconstructed video object.

28. The method of claim 27, wherein said node is a material type node.

29. The method of claim 27, wherein said node is a MaterialKey node.

30. The method of claim 28, wherein said MaterialKey node comprises a transparency field, an isKeyed field, an isRGB field, a keyColor field, a lowThreshold field, and a highThreshold field.

31. The method of claim 27, wherein said node is a texture node.

32. The method of claim 31, wherein said texture node is a VideoObjectKeyed2D node.

* * * * *